United States Patent
Schirmer

(10) Patent No.: US 11,673,309 B2
(45) Date of Patent: Jun. 13, 2023

(54) CRYSTAL CLEAR HIGH BARRIER PACKAGING FILM

(71) Applicant: Henry G. Schirmer, Spartanburg, SC (US)

(72) Inventor: Henry G. Schirmer, Spartanburg, SC (US)

(*) Notice: Subject to any disclaimer, the term of this patent is extended or adjusted under 35 U.S.C. 154(b) by 0 days.

(21) Appl. No.: 17/508,612

(22) Filed: Oct. 22, 2021

(65) Prior Publication Data

US 2022/0161478 A1    May 26, 2022

Related U.S. Application Data

(63) Continuation-in-part of application No. 17/504,769, filed on Oct. 19, 2021, which is a continuation-in-part
(Continued)

(51) Int. Cl.
 *B29C 48/18* (2019.01)
 *B29C 48/00* (2019.01)
 (Continued)

(52) U.S. Cl.
 CPC ........ *B29C 48/185* (2019.02); *B29C 48/0018* (2019.02); *B29C 48/19* (2019.02);
 (Continued)

(58) Field of Classification Search
 CPC ... B29C 48/185; B29C 48/19; B29C 48/0018; B29C 55/023; B29C 55/04; B29D 7/01;
 (Continued)

(56) References Cited

U.S. PATENT DOCUMENTS 3,600,488 A   8/1971  Yazawa
3,648,995 A   3/1972  Seyfried et al.
(Continued)

FOREIGN PATENT DOCUMENTS

CN   1251856    4/2006
CN   103358524  12/2015
(Continued)

OTHER PUBLICATIONS

Eastman Technical Data Sheet for Eastman SPECTAR Copolyester 14471 (2019).
(Continued)

*Primary Examiner* — Vincent Tatesure
(74) *Attorney, Agent, or Firm* — Maxwell J. Petersen; FisherBroyles, LLP

(57) ABSTRACT

A transparent multilayer coextruded heat shrinkable barrier film is useful for high-value packaging applications such as food and medical device packaging. The transparent multilayer coextruded heat shrinkable barrier film includes first and second outer layers formed using a transparent polyester or polyester copolymer; an inner nanolayer sequence including a plurality of nanolayers a) including ethylene vinyl alcohol, alternating with nanolayers b) including at least one of ethylene ethyl acrylate, low density polyethylene and linear low density polyethylene, each of the nanolayers b) having a degree of crystallinity less than about 45%; and adhesive layers between each of the two outer layers and the inner nanolayer sequence. The film has a light transmittance of at least about 80% and a heat shrunk of at least about ten percent in at least one direction.

22 Claims, 4 Drawing Sheets

Related U.S. Application Data of application No. 17/231,062, filed on Apr. 15, 2021, now abandoned.

(60) Provisional application No. 63/123,588, filed on Dec. 10, 2020, provisional application No. 63/116,965, filed on Nov. 23, 2020.

(51) Int. Cl.

| | |
|---|---|
| *B29C 55/02* | (2006.01) |
| *B29C 55/04* | (2006.01) |
| *B29D 7/01* | (2006.01) |
| *B29C 48/19* | (2019.01) |
| *B29L 9/00* | (2006.01) |
| *B29K 23/00* | (2006.01) |
| *B29K 67/00* | (2006.01) |
| *B29K 105/00* | (2006.01) |
| *B29K 33/00* | (2006.01) |

(52) U.S. Cl.
CPC ............ *B29C 55/023* (2013.01); *B29C 55/04* (2013.01); *B29D 7/01* (2013.01); *B29K 2023/0625* (2013.01); *B29K 2023/0633* (2013.01); *B29K 2023/083* (2013.01); *B29K 2033/08* (2013.01); *B29K 2033/12* (2013.01); *B29K 2067/003* (2013.01); *B29K 2105/0097* (2013.01); *B29K 2995/0012* (2013.01); *B29K 2995/0026* (2013.01); *B29K 2995/0039* (2013.01); *B29K 2995/0041* (2013.01); *B29K 2995/0051* (2013.01); *B29K 2995/0067* (2013.01); *B29K 2995/0069* (2013.01); *B29L 2009/00* (2013.01)

(58) Field of Classification Search
CPC ....... B32B 27/08; B32B 27/32; B32B 27/365; B32B 7/12; B32B 2250/05; B32B 2307/412; B32B 2553/00; B65D 65/40
USPC .......................................... 428/515; 442/327
See application file for complete search history.

(56) References Cited

U.S. PATENT DOCUMENTS

| | | | |
|---|---|---|---|
| 3,663,134 A | 5/1972 | Coquelin | |
| 3,887,613 A | 6/1975 | Sato | |
| 3,904,334 A | 9/1975 | Yazawa | |
| 4,115,047 A | 9/1978 | Stelmack | |
| 9,017,053 B2 | 4/2015 | Rubbelke | |
| 10,435,526 B2 | 10/2019 | Liao | |
| 2007/0187856 A1 | 8/2007 | Kitaju | |
| 2009/0291284 A1 | 11/2009 | Frauenhofer | |
| 2013/0243894 A1 | 9/2013 | Schirmer | |
| 2015/0111092 A1 | 4/2015 | Janousek | |
| 2015/0360450 A1 | 12/2015 | Barbaroux | |
| 2017/0361582 A1* | 12/2017 | Planeta | ................ B32B 37/153 |
| 2020/0298459 A1 | 9/2020 | Schirmer | |

FOREIGN PATENT DOCUMENTS

| | | |
|---|---|---|
| CN | 102941671 | 3/2016 |
| CN | 103624970 B | 3/2017 |
| CN | 207808448 | 4/2018 |
| CN | 10833647 | 6/2018 |
| DE | 2125903 | 12/1971 |
| DE | 3920194 | 1/1993 |
| DE | 102005010471 | 9/2006 |
| EP | 2639038 | 9/2013 |
| GB | 853460 | 11/1960 |
| JP | H06339986 | 12/1994 |
| JP | H09109247 | 4/1997 |
| JP | 2007210158 | 8/2007 |
| WO | 2011-058072 | 5/2011 |
| WO | 2012159233 | 11/2012 |
| WO | 2018126309 | 7/2018 |

OTHER PUBLICATIONS

Wang et al., "Light Transmission and Haze of Polyethylene Blown Thin Films," Polymer Engineering and science. Feb. 2001, vol. 41, No. 2, pp. 358-372 (2001).
Advertisement, "Glacier-Flex III", http://www.alphamarathon.biz/alpha-exclusive-technologies/glacier-flex-iii.html, Feb. 4, 2019.
Collin, "Collin Medical Line," https://www.collin-solutions.com/en/product-units/medical-line/, Feb. 4, 2019.
Xiao et al., "performamce Comparison of Water-Quench versus Air-quench Blown Films," http://www.beca.com/files/pdf/Karen%20Xiao%20Water%20quenched%20vs%20air%20blown%20PPT.pdf, Feb. 4, 2019.
Product Brochure, "Mylar Polyester Film Optical Properties," Dupont Teijin Films, Jun. 2003.
Omnexus, "Plastics & Elastomers: Transparency" https://omnexus.speciachem.com/polymer-properties/properties/transparency, 2021.

* cited by examiner

CRYSTAL CLEAR HIGH BARRIER PACKAGING FILM

RELATED APPLICATIONS

This patent application is a continuation-in-part of U.S. patent application Ser. No. 17/504,769, filed on Oct. 19, 2021, which in turn claims priority to U.S. Provisional Application 63/123,588, filed on Dec. 10, 2020, the disclosures of which are incorporated by reference. U.S. patent application Ser. No. 17/504,769, filed on Oct. 19, 2021, is also a continuation-in-part of U.S. patent application Ser. No. 17/231,062, filed on Apr. 15, 2021, and the preceding U.S. Provisional Application 63/116,965, filed on Nov. 23, 2020, the disclosures of which are incorporated by reference. This patent application claims priority to all of the foregoing applications.

FIELD OF THE INVENTION

This invention is directed to a multilayer coextruded film having both high barrier and high clarity, useful for high-value packaging applications, and to a multilayer coextruded shrink film having high barrier and high clarity.

BACKGROUND OF THE INVENTION

Barrier films are commonly used for food and medical packaging applications that require high resistance to penetration by both moisture and oxygen. Barrier films are commonly made by combining layers of low density polyethylene ("LDPE") or linear low density polyethylene ("LLDPE"), which provide moisture barrier, with layers of polyamide ("PA") and/or ethylene vinyl alcohol ("EVOH"), which provide oxygen barrier. The oxygen barrier materials are hygroscopic and self-absorb moisture from the air, which in turn lowers their oxygen barrier properties. For this reason, the barrier films are usually constructed with the oxygen barrier layer(s) in the center, surrounded and protected by the moisture barrier layers, and joined to the moisture barrier layers using known polymer-based adhesive resins. For example, one simple barrier film structure has the following basic layer sequence: LDPE/Adhesive/EVOH/Adhesive/LDPE. Barrier films can also have a thickness and integrity that renders them thermoformable for the production of barrier containers.

Conventional layer combinations used to provide high barrier to moisture and oxygen often do not provide films with high transparency and clarity. The relative lack of transparency and clarity can result in packages that appear hazy and/or compromised to the consumer and can make the product contained in the package to appear compromised as well. Especially with high-value medical and food packages, it is important to maintain the perception that the product contained therein is clean, fresh and free of blemishes or contamination. There is a need or desire for food and medical packages that provide high barrier to moisture and oxygen without distorting or diminishing the images of the products contained therein.

SUMMARY OF THE INVENTION

The invention is directed to a high barrier, high transparency multilayer coextruded film that is useful for packaging foods, medical supplies, and other items where high-end performance is desired. The invention is also directed to a high barrier, high transparency, multilayer coextruded shrink film formed by stretch orienting the high barrier, high transparency multilayer coextruded film, and heat shrinkable and heat shrunk packages formed from the shrink film.

The transparent barrier film of the invention combines the high moisture barrier performance of selected ethylene polymers with the high gas barrier performance of ethylene vinyl alcohol in a manner that utilizes a novel selection of low crystallinity layer polymers and film processing conditions to optimize the degree of transparency throughout the film. The resulting high barrier packaging film suitably has a degree of transparency of at least about 80% or higher, measured using ASTM D1746. The high barrier, high transparency shrink film can be formed by stretch orienting the barrier film, for example using a vacuum thermoforming process, and by allowing the stretched (e.g., thermoformed) barrier film to cool in the stretched condition. The stretch oriented film can then be used to form a package, such as a thermoformed package, and can be heated to above the glass transition temperature of the lower melting layer or layers to cause shrinkage of the film around the packaged product.

In one embodiment, the invention is directed to a transparent multilayer coextruded barrier film for use in packaging, which includes:

first and second outer layers formed using a transparent amorphous polymer;

an inner nanolayer sequence including a plurality of nanolayers a) including ethylene vinyl alcohol, alternating with a plurality of nanolayers b) including at least one of ethylene ethyl acrylate, ethylene acrylic acid, low density polyethylene and linear low density polyethylene, each of the nanolayers b) having a degree of crystallinity less than about 45%; and adhesive layers between each of the first and second outer layers and the inner nanolayer sequence;

wherein the film has a light transmittance of at least about 80%.

In another embodiment, the invention is directed to a transparent multilayer coextruded barrier film for use in packaging, which includes:

first and second outer layers formed using a polyester copolymer;

an inner nanolayer sequence including a plurality of nanolayers a) including ethylene vinyl alcohol, alternating with nanolayers b) including at least one of ethylene ethyl acrylate and ethylene acrylic acid, and adhesive layers between each of the two outer layers and the inner nanolayer sequence.

In another embodiment, the invention is directed to a transparent multilayer coextruded barrier film for use in packaging, which includes:

first and second outer layers formed using a transparent amorphous polymer;

a first inner nanolayer sequence including at least three nanolayers a) including ethylene vinyl alcohol, alternating with at least three nanolayers b) including an adhesive, each of the nanolayers b) having a degree of crystallinity less than about 45%;

adhesive layers between each of the two outer layers and the first inner nanolayer sequence; and a second inner nanolayer sequence including at least three nanolayers c) including a first low density polyethylene or linear low density polyethylene, alternating with at least three nanolayers d) including a second low density polyethylene or linear low density polyethylene, wherein each of the nanolayers c) and d) has a degree of crystallinity less than about 45%.

In another embodiment, the invention is directed to a transparent multilayer coextruded heat shrinkable barrier film for use in packaging, which includes:

first and second outer layers formed using a transparent amorphous polymer;

an inner nanolayer sequence including a plurality of nanolayers a) including ethylene vinyl alcohol, alternating with a plurality of nanolayers b) including at least one of ethylene ethyl acrylate, ethylene acrylic acid, low density polyethylene and linear low density polyethylene, each of the nanolayers b) having a degree of crystallinity less than about 45%; and adhesive layers between each of the first and second outer layers and the inner nanolayer sequence;

wherein the film has a light transmittance of at least about 80% and a heat shrink of at least about 10 percent in at least one direction.

In another embodiment, the invention is directed to a transparent multilayer coextruded heat shrinkable barrier package, which includes two opposing film segments joined at respective edges, each film segment comprising:

first and second outer layers formed using a polyester copolymer;

an inner nanolayer sequence including a plurality of nanolayers a) including ethylene vinyl alcohol, alternating with nanolayers b) including at least one of ethylene ethyl acrylate and ethylene acrylic acid, and adhesive layers between each of the two outer layers and the inner nanolayer sequence;

wherein the heat shrinkable package has a light transmittance of at least about 80% and a heat shrink of at least about 10 percent in at least one direction.

In another embodiment, the invention is directed to a method of making a transparent multilayer coextruded heat shrinkable barrier package, which includes the steps of:

providing a film including first and second outer layers formed using a polyester copolymer, an inner nanolayer sequence including a plurality of nanolayers a) including ethylene vinyl alcohol, alternating with nanolayers b) including at least one of ethylene ethyl acrylate and ethylene acrylic acid, and adhesive layers between each of the two outer layers and the inner nanolayer sequence;

stretch orienting the film in at least one direction to form a stretch oriented film;

placing a product between two segments of the stretch oriented film; and vacuum sealing the segments of the stretch oriented film at corresponding edges of the segments to form the transparent multilayer coextruded heat shrinkable barrier package;

wherein the heat shrinkable package has a light transmittance of at least about 80% and a heat shrink of at least about 10 percent in at least one direction.

In order to achieve optimal transparency, the multilayer coextruded barrier film can be produced by a blown film process as described herein that utilizes a selection of highly transparent polymers and layer arrangement in a multilayer nanolayer blown film. Alternatively, or in addition to the foregoing, the multilayer coextruded barrier film can be made using a rapid quench process, for example, a water cooling apparatus including a wet porous material in direct contact with the blown film bubble and surrounding an outer circumference of the bubble. The wet porous material continuously wipes the outer circumference of the bubble with water as the bubble moves along the traveling path, providing the blown film with uniform and rapid quenching for optimal transparency. Notwithstanding the foregoing, the water cooling apparatus may not be needed to achieve the desired film transparency if a novel selection of nanolayer polymers and layer arrangement are employed, as described further in this specification.

The transparent multilayer coextruded heat shrinkable barrier film can be produced by stretch orienting the transparent multilayer coextruded barrier film in one or more directions. The orientation of the film can be accomplished using a vacuum thermoforming process, a nip roller process, an inline orientation tenter frame, or another orientation apparatus that stretches the film in one or more directions and allows the film to cool in the stretched state, thereby temporarily "locking in" the orientation of the polymer molecules in one or more layers. The orientation can be performed by stretching the film in one more directions at a temperature that exceeds the glass transition temperature $T_g$ of the polymer(s) in one or more of the film layers and is typically performed between about 185° F. (85° C.) and about 400° F. (205° C.). "Monoaxial orientation" typically refers to stretch orientation on the machine direction of the film. "Biaxial orientation" typically refers to mutually perpendicular orientations in both the machine and transverse directions. Vacuum thermoforming, by its nature, typically stretches the film in the machine and transverse directions, and at angles that lie in between the machine and transverse directions.

The transparent multilayer coextruded heat shrinkable barrier package can be produced by forming two opposing segments of the heat shrinkable barrier film, sometimes referred to as "halves," and placing a product (for example, a food or medical product) in between the segments. The combination can then be placed in a vacuum and heat sealed at the edges to form the transparent multilayer coextruded heat shrinkable barrier package. The sealed heat shrinkable barrier package can then be heated to a temperature above the glass transition temperature of one or more of the polymer layers, whereupon the polymer molecules return toward their original unoriented molecular state as the film shrinks to form a transparent multilayer coextruded heat shrunk barrier package. Because of its excellent transparency and high barrier properties, the heat shrunk barrier package can be used to contain and store various high-value food and medical products for which an attractive appearance is important to the purchaser.

With the foregoing in mind, it is a feature and advantage of the invention to provide a transparent multilayer coextruded barrier film that combines high barrier properties with high transparency for use in high-value applications, including without limitation high value packaging applications for food and medical devices.

It is also a feature and advantage of the invention to provide a transparent multilayer coextruded barrier film that can be thermoformed and used to provide transparent high-barrier containers for use in high-value applications, including without limitation high value packaging applications for food and medical devices.

It is also a feature and advantage of the invention to provide a heat shrinkable transparent multilayer coextruded barrier film that combines high barrier properties with high transparency for use in high-value packaging applications.

It is also a feature and advantage of the invention to provide a heat shrinkable transparent multilayer coextruded barrier package that combines high barrier properties with high transparency for the packaging of high-value products, such as food and medical products.

The foregoing and other features and advantages of the invention will become further apparent from the following detailed description of the invention, read in conjunction with the drawings.

DETAILED DESCRIPTION OF THE INVENTION

Figure 1:
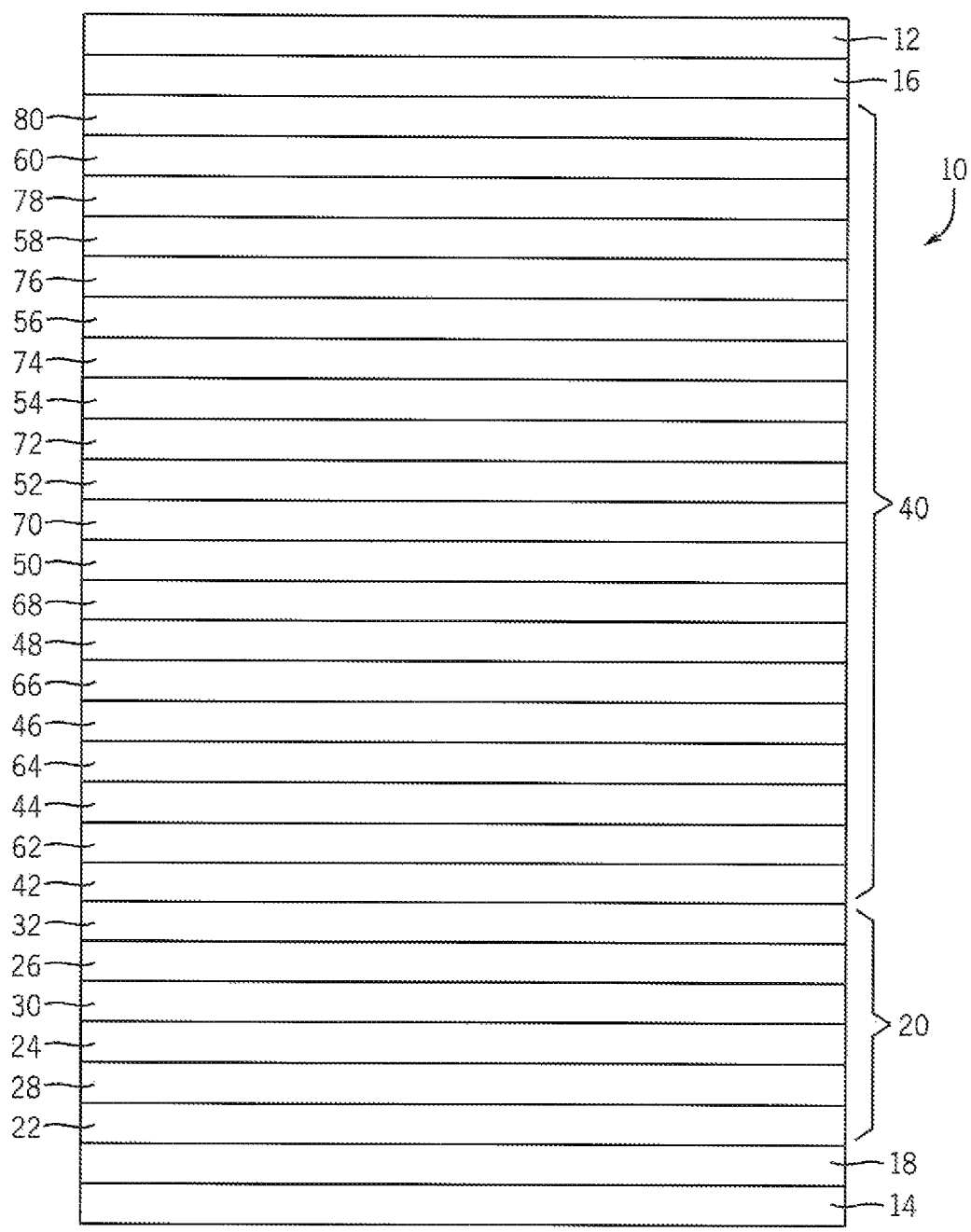
FIG. 1 is a schematic side view of one example of a transparent multilayer coextruded barrier film of the invention that includes 30 nanolayers.

The transparent multilayer coextruded barrier film of the invention employs a combination of optimal material and layer selection and optimal processing to yield a film that has a high level of transparency in addition to excellent barrier to penetration by oxygen and moisture. The nature and importance of the special processing needed to achieve transparency, varies with the selection of polymers and layer arrangement. When optimal film transparency and barrier properties can be achieved through the selection of polymers and layer arrangement, the special processing, namely rapid quenching in the form of water quenching, may not be needed. When special processing via the water quenching process described herein is employed, the polymers and layer arrangement can be varied by a certain amount from what is considered optimal, and the optimal transparency can still be achieved. For purposes of this disclosure, "optimal transparency" or "high transparency" refers to barrier films having a light transmittance of at least about 80%, suitably at least about 84%, or at least about 88%, measured using ASTM D1746.

Multilayer barrier films that can achieve high transparency without requiring special processing include select nanolayer films that include polyethylene terephthalate glycol (PETG) as one or both of the outer layers. PETG is both highly transparent and has excellent heat seal properties. In order for the overall film to have high transparency, it is especially important that one or both outer layers have high transparency and do not possess haze or other surface properties that would inhibit the percent light transmittance of the overall film. PETG is amorphous, having a glass transition temperature of about 80° C. The amorphous nature of PETG not only renders the affected outer layer(s) clear but contributes to making the entire film clear. PETG is also thermoformable and contributes to the thermoformability of the entire film. For enhanced thermoformability, PETG can also be used in one or more inner layers of the barrier film.

Other amorphous polymers that can be used as outer layers to render inner film layers (and thus, the overall film) clearer include without limitation other amorphous polyesters, polystyrene and polystyrene copolymers, polycarbonate, and transparent acrylic polymers. In general, the selected polymers should have a low crystallinity and a transparency measured as a light transmittance of at least about 80%, or at least about 84%, or at least about 88% determined according to ASTM D1746. While the transparent outer layers can improve the transparency of the overall film by eliminating any haze resulting from surface roughness of adjacent inner layers, it is also desirable to design the inner layers with the maximum possible transparency. This can be accomplished using nanolayers as described below, in which every functional layer (e.g., every gas barrier layer and every moisture barrier layer) is adjacent to another layer that improves the transparency of the functional layer.

The transparent, coextruded multilayer barrier film can also include at least one gas barrier layer or layer combination, and at least one moisture barrier layer or layer combination. The gas barrier layer or layer combination can include ethylene-vinyl alcohol (EVOH), which has gained worldwide recognition for its barrier properties against permeant gases such as oxygen, carbon dioxide and nitrogen. The excellent barrier properties of EVOH can be attributed to the intermolecular and intramolecular bonding caused by the polar hydroxyl groups in the vinyl alcohol units. However, EVOH absorbs water and the water absorption weakens those bonds, causing a decrease in the gas barrier properties. For this reason, EVOH layers in a barrier film should be sandwiched between and protected by moisture barrier layers. For optimal transparency and protection from moisture, the EVOH can be present in multiple nanolayers alternating with relatively transparent, amorphous, low crystallinity moisture barrier nanolayers that also serve as adhesive layers. Ethylene ethyl acrylate (EEA) and ethylene acrylic acid (EAA) are examples of two such moisture barrier polymers that can also serve as adhesive layers. Other suitable moisture barrier nanolayers that provide excellent adhesion between adjacent EVOH nanolayers include blends of EEA or EAA with an anhydride-grafted polyethylene, for example, a modified polyethylene sold under the name PLEXAR®. Such adhesive blends can include from about 10% to about 90% by weight EEA or EAA and about 10% to about 90% by weight anhydride-modified polyethylene, or about 25% to about 75% by weight EEA or EAA and about 25% to about 75% by weight anhydride-modified polyethylene, or about 40% to about 60% by weight EEA or EAA and about 40% to about 60% by weight anhydride-modified polyethylene, or about 50% by weight EEA or EAA and about 50% by weight anhydride-modified polyethylene.

In one embodiment, the transparent, coextruded multilayer barrier film can include a gas barrier nanolayer combination that includes "x" nanolayers of EVOH alternating with nanolayers of adhesive, wherein the adhesive nanolayers are formed of EEA, EAA, a combination of EEA and EAA, or a combination of EEA or EAA with an anhydride-modified polyethylene. For example, the gas barrier nanolayer combination, which is located inside the transparent, multilayer coextruded barrier film, can include the following sequence of layers:

(adhesive/EVOH)$_x$/adhesive where "x" can be at least 3, or at least 4, or at least 5, or at least 6, or at least 7, or at least 8, or at least 9, or at least 10, or at least 15, or at least 20, or at least 25, or at least 30, or at least 35, or at least 40, or at least 45, or at least 50.

The moisture barrier layer or layer combination can also include at least one primary moisture barrier layer or layer combination that provides the film with overall excellent moisture barrier properties, as well as structural integrity. In order to preserve film clarity, the moisture barrier layer or layer combination can include a first low density polyethylene or linear low density polyethylene having low crystallinity, suitably less than about 45%, or less than about 40%, and/or in a range of about 35% to about 40%. The low density or linear low density polyethylene can have a density of about 0.910 to about 0.925 grams/cm$^3$ and can be present as moisture barrier nanolayers. In one embodiment, the nanolayers formed of the first low density or linear low density polyethylene can alternate with nanolayers formed of a second low density or linear low density polyethylene. The second low density polyethylene or linear low density polyethylene can also have low crystallinity, suitably less than about 45%, or less than about 40%, and/or in a range of about 35% to about 40%. The second low density or linear low density polyethylene can have a density of about 0.910 to about 0.925 grams/cm$^3$. The alternating nanolayers of first and second low crystallinity low density or linear low density polyethylene further contribute high transparency to the multilayer coextruded barrier film, along with moisture barrier, strength, and integrity.

In one embodiment, the transparent, coextruded multilayer barrier film can include a moisture barrier nanolayer combination that includes "y" nanolayers of the first low density or linear low density polyethylene ("polyethylene$_1$") alternating with nanolayers of the second low density or linear low density polyethylene ("polyethylene$_2$"). For example, the moisture barrier nanolayer combination, which can be located inside the transparent, multilayer coextruded barrier film, can include the following sequence of layers:

(ployethylene$_1$/polyethylene$_2$)$_y$ where "y" can be at least 3, or at least 4, or at least 5, or at least 6, or at least 7, or at least 8, or at least 9, or at least 10, or at least 15, or at least 20, or at least 25, or at least 30, or at least 35, or at least 40, or at least 45, or at least 50.

In one embodiment, the gas barrier nanolayer combination can be combined with the moisture barrier nanolayer combination to provide a transparent, coextruded multilayer barrier film that includes amorphous polymer ("AP") outer layers for excellent transparency, heat sealability and thermoformability, and EEA or EAA adhesive (or one of the foregoing adhesive combinations) joining the nanolayer combinations to each other and to the outer layers. For example, the transparent, coextruded multilayer barrier film can include the foregoing sequence of layers:

AP/(EEA or EAA)/moisture barrier nanolayer combination/gas barrier nanolayer combination/AP where the amorphous polymers (AP) are selected from amorphous polyester copolymer (e.g., PETG), polystyrene, polystyrene copolymers, polycarbonate, amorphous acrylic polymers and copolymers, and combinations thereof, and are selected to have a light transmittance of at least about 80%, or at least about 84%, or at least about 88%.

Referring to FIG. 1, an exemplary multilayer coextruded film 10 includes first and second outer layers 12 and 14 which can be formed using an amorphous polymer or polymer combination. Suitable amorphous polymers include those having a light transmittance of at least about 80%, or at least about 84%, or at least about 88%, measured using ASTM D1746. Suitable amorphous polymers that can meet these requirements include without limitation selected amorphous polyester homopolymer or copolymer, polystyrene, polystyrene copolymers, polycarbonate, amorphous acrylic polymers and copolymers, and combinations thereof, and are selected to have a light transmittance of at least about 80%, or at least about 84%, or at least about 88%. Of these, some of the more amorphous copolymers (for example, PETG) can achieve the desired light transmittance without employing the special water quenching techniques described below. Otherwise, the stated light transmittance should not be regarded as an inherent property of the listed polymers and copolymers. Many of them may require the special processing described below to achieve the desired transparency, as measured by light transmittance.

Suitable polyester homopolymers include without limitation polyethylene terephthalate, polybutylene terephthalate, and combinations thereof. Polyester homopolymers provide excellent transparency but are generally not heat sealable. In order to provide the film with heat sealability, one or both of the outer layers can be formed using a polyester copolymer. Suitable polyester copolymers include without limitation polyethylene terephthalate glycol, polyethylene terephthalate-1,4-cyclohexane-2 methyl ester, polyester-polyether block copolymers, and combinations thereof. Polyethylene terephthalate glycol (PETG) is particularly suitable for one or both of the outer layers 12 and 14 because it provides excellent heat sealability and transparency. For optimal transparency, the polyester copolymer can have a degree of crystallinity of less than about 20%, suitably less than about 15%, measured using ASTM D1505. The outer layers 12 and 14, and other film layers described below, should be as thin as possible in order to provide the multilayer coextruded film 10 with maximum transparency. The outer layers 12 and 14 can be nanolayers or microlayers. The term "nanolayers" refers to film layers having thicknesses in the submicron range, typically between about 1 to about 999 nanometers, or about 10 to about 500 nanometers. The term "microlayers" refers to layers having thicknesses of about 1 to about 999 microns, or about 5 to about 500 microns, or about 10 to about 100 microns.

The multilayer coextruded film 10 can also include first and second adhesive tie layers 16 and 18 between the outer layers 12 and 14 and the inner nanolayer sequence(s) described below. The first and second adhesive tie layers can be formed of a soft polymer that exhibits tackiness without compromising film clarity. Suitable soft polymers include without limitation ethylene methyl acrylate, ethylene ethyl acrylate, ethylene acrylic acid, ethylene methacrylic acid, and combinations thereof. Ethylene ethyl acrylate and ethylene acrylic acid are particularly suitable for one or both of the adhesive tie layers 16 and 18 because of their low crystallinity and high clarity. The foregoing adhesives can also be blended with other adhesive materials, such as chemically-modified polyolefins, provided that the desired clarity can be maintained. Suitable chemically-modified polyolefins include without limitation anhydride-modified polyethylene, for example, low density or linear low density polyethylene grafted with maleic anhydride. Examples of suitable chemically-modified polyolefins include those sold under the name PLEXAR® sold by MSI Technology. The chemically-modified polyolefin can improve the adhesion between the polyester homopolymer or copolymer outer layers and the ethylene-vinyl alcohol in the first inner nanolayer sequence described below. The adhesive tie layers can suitably be nanolayers having only the thickness needed to ensure adequate bonding between adjacent layers.

The multilayer coextruded film 10 also includes at least a first inner nanolayer sequence 20 that provides the film 10 with oxygen barrier properties. The first inner nanolayer sequence includes at least one and suitably a plurality of oxygen barrier nanolayers including ethylene-vinyl alcohol (EVOH). In the illustrated embodiment, the first inner nanolayer sequence 20 includes a plurality of nanolayers a) that include EVOH, shown as layers 22, 24 and 26. The nanolayers a) alternate with a plurality of nanolayers b), shown as layers 28, 30 and 32. The nanolayers b) can include at least one of ethylene-ethyl acrylate, ethylene acrylic acid, low density polyethylene and linear low density polyethylene, and should have a degree of crystallinity less than 45%, suitably less than about 40% in order to provide maximum transparency. When the layers b) are formed using ethylene-ethyl acrylate or ethylene acrylic acid, they inherently have low crystallinity and high transparency as explained above. When the nanolayers b) are formed using low density polyethylene or linear low density polyethylene, the materials should be selected to have a crystallinity at the lower end of the conventional range for optimal clarity. Low density and linear low density polyethylene typically have crystallinities ranging from about 35% to about 60%. When used as the layers b), the low density or linear low density polyethylene should be selected to have a crystallinity at the lower end of the normal range, suitably about 35% to about 45%, or about 35% to about 40%, and should have a density of about 0.910 to about 0.925 grams/cm$^3$. The nanolayers b) can also include an amount of anhydride-grafted polyolefin (described above) to provide better adhesion between the nanolayers b) and the EVOH in the nanolayers a).

When the nanolayers b) are formed of low density or linear low density polyethylene, they provide the multilayer coextruded film 10 with additional moisture barrier, strength and integrity. When the density and crystallinity of these materials are sufficiently low as described above, the nanolayers b) can also provide sufficient adhesion between the EVOH layers for some applications. In one alternative embodiment (not illustrated), additional nanolayers ab) formed of an adhesive tie resin can be positioned between the nanolayers a) and b) to provide better bonding strength. The nanolayers ab) can be formed of any of the adhesive materials described above and can suitably include ethylene-ethyl acrylate or ethylene acrylic acid, alone or blended with an anhydride-grafted polyolefin. The first inner nanolayer sequence 20 can include any suitable number of alternating nanolayers a) and b) and (if appropriate) intervening nanolayers ab). For example, the first nanolayer sequence may include at least three nanolayers a), or at least four nanolayers a), or at least five nanolayers a), or at least six nanolayers a), or at least seven nanolayers a), or at least eight nanolayers a), or at least nine nanolayers a), or at least ten nanolayers a), or at least 15 nanolayers a), or at least 20 nanolayers a), or at least 25 nanolayers a), or at least 30 nanolayers a), or at least 35 nanolayers a), or at least 40 nanolayers a), or at least 45 nanolayers a), or at least 50 nanolayers a). The nanolayers a) may alternate with at least three nanolayers b), or at least four nanolayers b), or at least five nanolayers b), or at least six nanolayers b), or at least seven nanolayers b), or at least eight nanolayers b), or at least nine nanolayers b), or at least ten nanolayers b), or at least 15 nanolayers b), or at least 20 nanolayers b), or at least 25 nanolayers b), or at least 30 nanolayers b), or at least 35 nanolayers b), or at least 40 nanolayers b), or at least 45 nanolayers b), or at least 50 nanolayers b).

In one embodiment, the first nanolayer sequence includes layers a) that include EVOH alternating with layers b) that include at least one of ethylene-ethyl acrylate and ethylene acrylic acid. in this embodiment, the multilayer coextruded film 10 can further include a second inner nanolayer sequence 40 as shown in FIG. 1. The second inner nanolayer sequence 40 can be designed to provide the film 10 with improved moisture barrier and structural integrity and can include a plurality of nanolayers c) alternating with a plurality of nanolayers d). The nanolayers c) can include a first low density polyethylene or linear low density polyethylene having low crystallinity, suitably less than about 45%, or less than about 40%, and/or in a range of about 35% to about 40%. The low density or linear low density polyethylene can have a density of about 0.910 to about 0.925 grams/cm$^3$. The nanolayers d) can include a second low density polyethylene or linear low density polyethylene having low crystallinity, suitably less than about 45%, or less than about 40%, and/or in a range of about 35% to about 40%. The low density or linear low density polyethylene can have a density of about 0.910 to about 0.925 grams/cm$^3$. The alternating nanolayers of first and second low crystallinity low density or linear low density polyethylene further contribute high transparency to the multilayer coextruded barrier film, along with moisture barrier, strength and integrity.

The second inner nanolayer sequence 40 can include any suitable number of alternating nanolayers c) and d) and (if appropriate) intervening nanolayers cd) (not shown). For example, the second nanolayer sequence may include at least three nanolayers c), or at least four nanolayers c), or at least five nanolayers c), or at least six nanolayers c), or at least seven nanolayers c), or at least eight nanolayers c), or at least nine nanolayers c), or at least ten nanolayers c), or at least 15 nanolayers c), or at least 20 nanolayers c), or at least 25 nanolayers c), or at least 30 nanolayers c), or at least 35 nanolayers c), or at least 40 nanolayers c), or at least 45 nanolayers c), or at least 50 nanolayers c). The nanolayers c) may alternate with a corresponding number of nanolayers d), for example, at least three nanolayers d), or at least four nanolayers d), or at least five nanolayers d), or at least six nanolayers d), or at least seven nanolayers d), or at least eight nanolayers d), or at least nine nanolayers d), or at least ten nanolayers d), or at least 15 nanolayers d), or at least 20 nanolayers d), or at least 25 nanolayers d), or at least 30 nanolayers d), or at least 35 nanolayers d), or at least 40 nanolayers d), or at least 45 nanolayers d), or at least 50 nanolayers d). In the embodiment illustrated in FIG. 1, the second nanolayer sequence 40 includes ten nanolayers c) identified as nanolayers 42, 44, 46, 48, 50, 52, 54, 56, 58 and 60, alternating with ten nanolayers d) identified as nanolayers 62, 64, 66, 68, 70, 72, 74, 76, 78 and 80.

The nanolayers in the first and second nanolayer sequences 20 and 40 are designed to produce a transparent, high barrier multilayer coextruded film 10 for high-end packaging applications, including without limitation the packaging of food and medical devices. Film clarity is a measure of percent light transmittance and can be measured using ASTM D1746. For example, when a film is exposed to 100% of an incident light source, the transmittance is 100% minus (percent absorption+percent reflection). For optimal performance and appearance, the high barrier multilayer coextruded film 10 should have a light transmittance of at least about 80%, suitably at least about 84%, or at least about 88%.

On order to ensure optimal transparency, the high barrier multilayer coextruded packaging film 10 can be manufactured using an upward or downward blown film coextrusion process that includes a rapid quench water cooling ring as described in U.S. Publication 2020/0298459, published to Schirmer on Sep. 24, 2020, the disclosure of which is incorporated by reference. The operation of the water quenching apparatus is briefly described below with respect to FIGS. 2 and 3 and is described in more detail in the foregoing publication.

Figure 2:
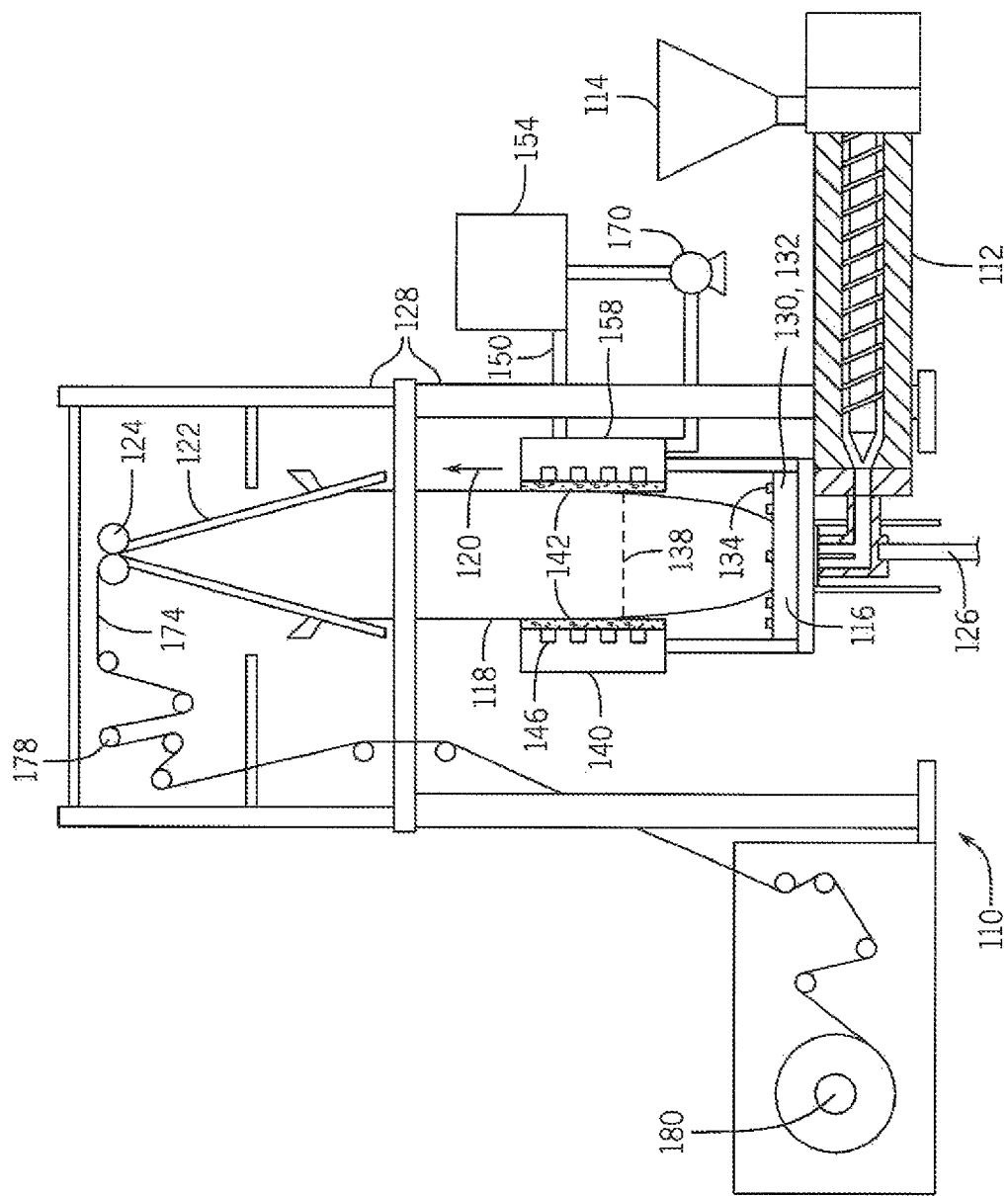
FIG. 2 is a schematic diagram of one example of a blown film line useful to make the high barrier, high transparency multilayer coextruded films of the invention, which is an upward blown film line.
Figure 3:
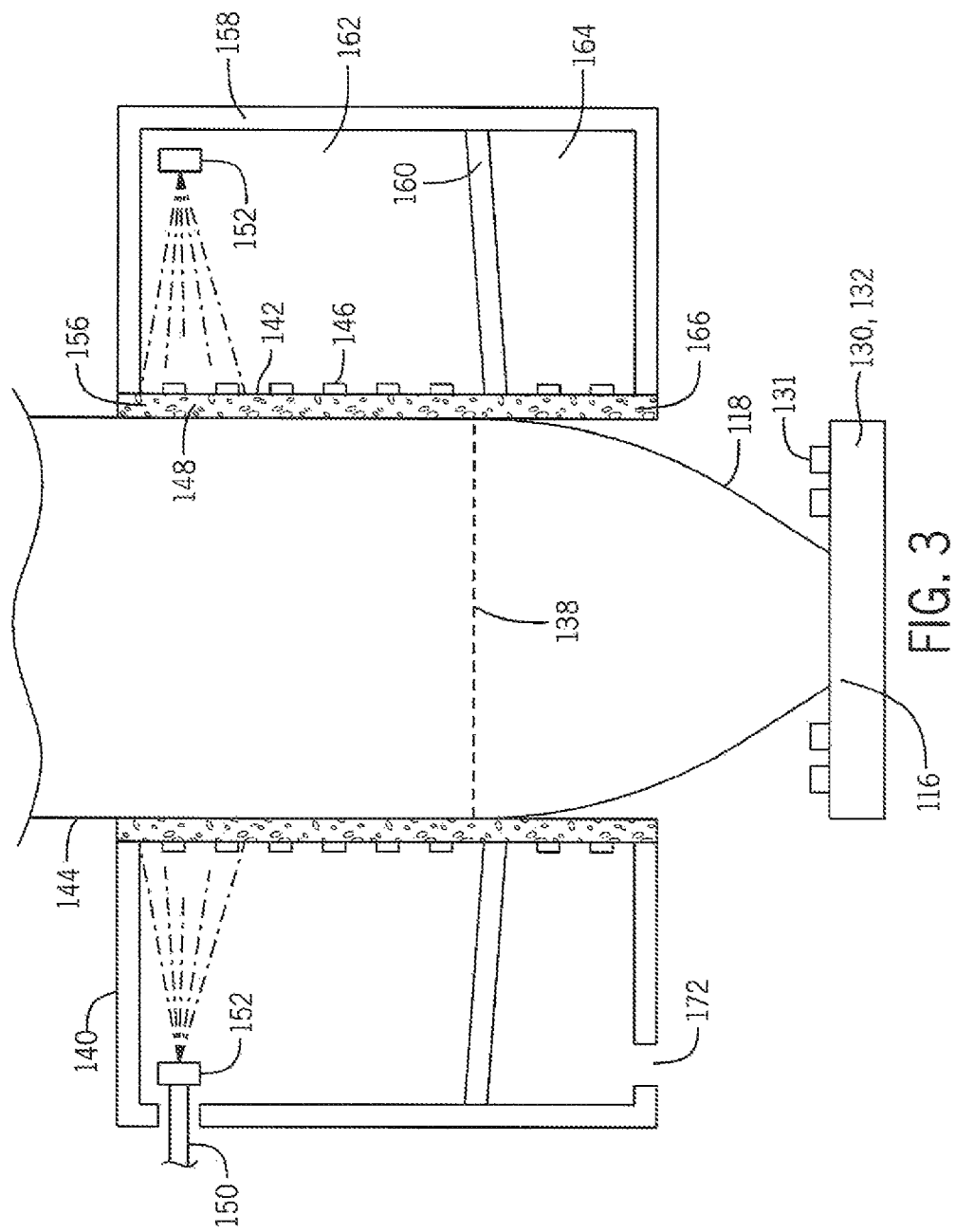
FIG. 3 is an enlarged schematic diagram of the portion of the blown film line of FIG. 1 that illustrates a water cooling apparatus used for optimal clarity.

Referring to FIGS. 2 and 3, a blown film line 110 includes a suitable number of extruders 112, each supplied with plastic resin using a hopper 114. Each extruder 112 melts the associated plastic resin, heats the resin to a desired extrusion temperature, and feeds it to an annular die 116 that is configured to produce a blown film bubble 118 (corresponding to the high barrier multilayer coextruded packaging film 10) having the desired number of layers. The annular die 116 extrudes the blown film bubble 118 in a direction of travel 120 toward a collapsing frame 122 and a plurality of nip rollers 124. A pressure tube 126, positioned below the annular die 116, employs air pressure to inflate the interior of the blown film bubble 118. The blown film line 110 may be mounted for stability to an upright frame 128.

An air cooling apparatus 130, mounted in the vicinity of the annular die 116, includes an air cooling ring 132 that supplies cooling air through a plurality of air vents 134. The air cooling apparatus 130 cools the blown film bubble 118, which is initially molten, to a lower temperature that is closer to its solidification point which appears at the frost line 138 along the direction of travel 120. A water cooling apparatus 140 is provided in the vicinity of the frost line 38, downstream from the air cooling apparatus 130 in the direction of travel 120, and between the air cooling apparatus 30 and the nip rollers 124. The water cooling apparatus 140 includes a wet porous material 142 positioned for direct contact with the blown film bubble 118 and surrounding an outer circumference 144 of the blown film bubble 118, so that the wet porous material 142 continuously wipes the outer circumference 144 of the blown film bubble 118 with water as the blown film bubble 118 moves along the travelling path 120. The wet porous material 142, upon contact with the blown film bubble 118, causes immediate and uniform further cooling of the blown film bubble 118. This rapid and uniform cooling results in a more uniform frost line 138 and a more uniform stretching and thickness of the multilayer blown film and provides the blown film with uniform and optimal clarity.

The wet porous material 142 can be any porous material that is capable of transmitting water through its thickness. The wet porous material 142 can be a cloth or screen and is suitably a mesh screen. In one embodiment, the water cooling apparatus 140 further includes a rigid porous backing 46 supporting the wet porous material 142. In an alternative embodiment, a soft porous material such as one made of polyester fibers or terry cloth can be stitched or otherwise mechanically attached to a mesh screen cylindrical backing using nylon threads or another suitable means of attachment, whereupon the combination of the soft material and mesh screen serves as the wet porous material.

The wet porous material 142 can be maintained in a uniform wet state by supplying an atomized water/air spray mixture to an outside surface 148 of the wet porous material 142. The atomized water/air spray mixture is supplied from a pipe 150 connected to a source 154 and feeds a manifold 152. The manifold 152 can be a single manifold that is circular and surrounds the entire outside surface 48 of an upper portion 156 of the wet porous material 142. Use of a single circular manifold 152, with uniformly spaced spray openings, permits an even distribution of the water/air spray mixture around the circumference of the wet porous material 142. The manifold 152 can be positioned inside a housing 58, which can be cylindrical and can enclose the wet porous material 142 and (if used) the rigid support backing 146. The housing 158 includes a divider 160 that separates an upper chamber 162 of the housing 158 from a lower chamber 164 of the housing 158. The atomized water/air spray mixture is applied continuously in the upper chamber 162 toward the upper portion 156 of the wet porous material 142 as shown.

Some of the water applied to the wet porous material 142 flows downward due to gravity into the lower portion 166 of the wet porous material 142 located in the lower chamber 164. The completely wetted porous material 142 contacts the exterior surface of the blown film bubble 118 as it moves in the direction of travel 120. The effects of this continuous contact are to complete the quenching of the blown film bubble 118 so as to maximize its transparency, while limiting its diameter and blow-up ratio. By controlling the quenching and diameter of the blown film bubble 118 in this fashion, the thickness of the blown film is also controlled more uniformly around the circumference of the blown film bubble 118, thereby reducing or eliminating thickness disparities.

Excess water can be removed from the lower portion 166 of the wet porous material 142 by applying a vacuum to the lower chamber 164 using a vacuum suction device 170, such as a vacuum pump, connected to an outlet 172 leading from the lower chamber 168. The vacuum suction device 170 removes any excess water from the wet porous material so as to maintain the floor and surrounding area in a dry state. Excess water thus removed can be recycled back into the source 154 that supplies the atomized water/air mixture.

The uniformly quenched and sized blown film bubble 118 then passes to the collapsing frame 122 and nip rollers 124, where the bubble 118 is collapsed into a flat film 174. The flat film 174 may be slit on both sides and separated using a slitting apparatus (not shown) to produce the high barrier multilayer coextruded packaging film 10.

Special coextrusion die equipment can also be employed to produce the high barrier multilayer coextruded packaging film 10 as shown and described herein. Suitable die equipment for producing this and other coextruded multilayer blown films having complex nanolayer structures is described in U.S. Pat. No. 11,090,853, issued Aug. 17, 2021, entitled "Modular Disk Coextrusion Die with Opposing Disk Arrangement" and listing Henry Schirmer as the sole inventor. This patent is incorporated by reference. The patent describes and claims a blown film coextrusion die formed using a plurality of cells of thin annular disks that are stacked on top of each other. Each cell includes a central routing disk having at least one flow opening, a first sub-cell on a first side of the central routing disk, and a second sub-cell on a second side of the central routing disk. Each first sub-cell includes a first distribution disk, a first transition disk and a first spreader disk. Each second sub-cell includes a second distribution disk, a second transition disk and a second spreader disk arranged in opposite order to the first sub-cell. Each distribution disk includes a distribution inlet opening, a plurality of outlet openings, and a plurality of channels connecting the distribution inlet opening with the plurality of outlet openings. Within each cell, the distribution inlet opening in the first distribution disk is about 180 degrees opposed to the distribution inlet opening in the second distribution disk.

The opposing disk arrangement enables each cell to produce two nanolayers using oppositely oriented sub-cells that balance the melt streams and pressures and enable the production of very thin uniform layers. The cells and disks within them can be arranged to produce a multilayer coextruded film having a large number of nanolayers and using up to twelve different polymer melt streams, enabling production of complex multilayer nanolayer blown films. Further details of the modular disk coextrusion die with the opposing disk arrangement are provided in the foregoing patent application.

The transparent multilayer coextruded multilayer film described in any of the foregoing embodiments can be rendered heat shrinkable by stretch orienting the film in one or more directions using known orientation equipment such as nip rollers, tenter frames, vacuum thermoforming, and other conventional techniques. Uniaxial orientation of the film in the machine direction of the film can be accomplished by stretching the film between two or more successive pairs of nip rollers, wherein each successive pair of nip rollers has a surface velocity that is greater that the surface velocity of the immediately preceding pair. Orientation of the film in the transverse direction can be accomplished using a tenter frame that stretches the film in the transverse direction as the film moves forward in a direction of travel. Biaxial orientation of the film in two mutually perpendicular directions can be accomplished by combining the foregoing techniques. Vacuum thermoforming can be used to stretch orient the film in multiple directions simultaneously by pulling the film, or segments of the film, into the shape of a formed package.

Stretch orienting can be performed at a temperature that is above the glass transition temperature of the lowest melting layer and below the glass transition temperature of the highest melting layer. For example, when the film includes one or both outer layers of PETG, which has a glass transition temperature of about 185° F. (85° C.) and one or more inner layers of EVOH having a glass transition temperature of about 400° F. (205° C.), the stretch orientation can be performed at between these two temperatures. The stretching increases the dimension of the film in the one or more directions of stretching, from a first original dimension to a second, larger stretched dimension, and orients the polymer molecules in the film layers. The film is cooled while being maintained in the stretched state, causing it to maintain the second, larger dimension in the one or more directions of stretching. The resulting heat shrinkable film ("shrink film") can be later heated without the stretching force and caused to "heat shrink" toward its initial, unstretched dimensions.

The amount of heat shrink can be measured using standard test procedures, including ASTM D2838-18. Using this test, the transparent multilayer heat shrinkable barrier film can have a heat shrink of at least about 10% in at least one direction, or at least about 15% in at least one direction, or at least about 20% in at least one direction, or at least about 25% in at least one direction, or at least about 30% in at least one direction. If the film is biaxially stretched in two mutually perpendicular directions such as in the machine and transverse directions, then it may have a heat shrink of at least about 10% in two mutually perpendicular directions, or at least about 15% in two mutually perpendicular directions, or at least about 20% in two mutually perpendicular directions, or at least about 25% in two mutually perpendicular directions, or at least about 30% in two mutually perpendicular directions. The maximum amount of heat shrink generally correlates with the amount of stretching used to produce the stretch oriented film. Heat shrinking reduces the stretch orientation by allowing the film to retract towards its initial pre-stretched dimensions in the absence of a stretching force.

The transparent multilayer heat shrinkable barrier film thus formed can be formed into segments used to form a package. Two opposing segments, which can be thermoformed into appropriate shapes, can be used to form a transparent multilayer coextruded heat shrinkable barrier package that maintains the transparency and the high barrier properties of the film. A product, for example a high value food or medical product, can be positioned in between the two opposing segments, which are sometimes referred to as "halves" The halves can be previously uniaxially or biaxially oriented, and/or thermoformed into a shape, as explained above. The opposing segments can then be heat sealed at their respective edges, suitably in the presence of a vacuum, to form a sealed package that is free of oxygen and air. The sealed package can then be heated in the absence of a stretching force at a temperature up to the original stretching temperature, causing the molecular orientations to relax, whereupon the film segments or halves retract and shrink toward their original unstretched dimensions.

Figure 4:
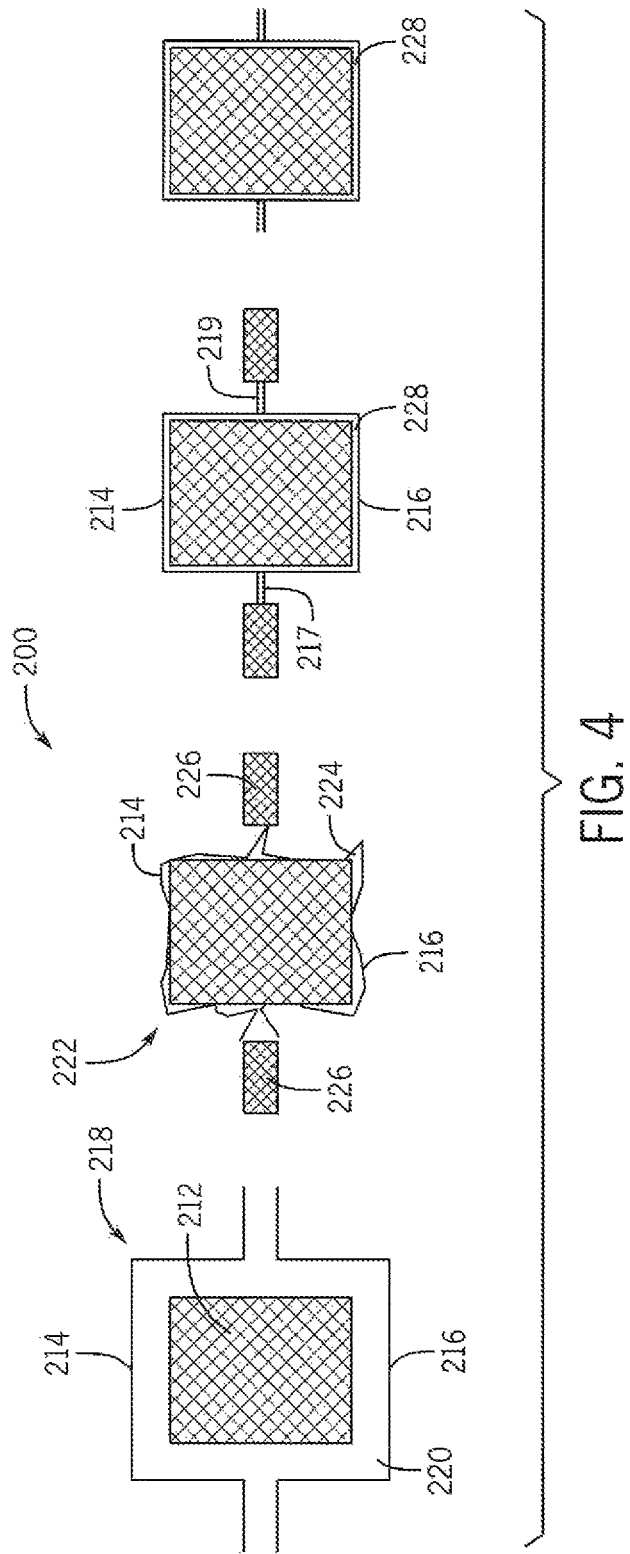
FIG. 4 is a schematic diagram of a process used to convert a stretch oriented transparent multilayer coextruded barrier film into a heat shrinkable transparent multilayer coextruded barrier package and a corresponding heat shrunk transparent multilayer coextruded barrier package.

FIG. 4 shows an exemplary process 200 for forming a transparent multilayer coextruded heat shrinkable barrier package and a corresponding heat shrunk barrier package from a transparent multilayer coextruded heat shrinkable barrier film of the invention. A product 212, which can be a medical or food product, is positioned between two stretch-oriented (e.g., thermoformed) film segments shown in side view as upper half 214 and lower half 216 at station 218 to form a combination 220. The resulting combination 220 is moved to a vacuum sealing station 222, where the edges of the opposing film segments 214 and 216 are heat sealed together using one or more heat sealers 226 in the presence of vacuum to form sealed edges 217 and 219, thereby enclosing the film segments 214 and 216 around the product 212 and forming the transparent multilayer coextruded heat shrinkable barrier package 224. The heat shrinkable barrier package 224 can then be heated in the absence of a stretching force at the sealing station 222 and/or a separate downstream heating station to a temperature above the glass transition temperature of the lowest melting layer and up to the original stretch orienting temperature of the film segments 214 and 216 to relax the molecular orientation in the polymer layers and shrink the film as shown. Because no stretching force is applied at this stage, the heating causes the sealed and stretched film segments 214 and 216 to retract and shrink toward, or at least closer to, their original unstretched dimensions to form a tightly shrink wrapped product. The resulting transparent multilayer coextruded heat shrunk barrier packages 228 maintain the high transparency and barrier properties of the original multilayer coextruded barrier film, resulting in a highly attractive and visually appealing packaged product.

The embodiments of the invention described herein are exemplary. Various modifications and improvements can be made without departing from the spirit and scope of the invention. The scope of the invention is indicated by the appended claims, and all changes that fall within the meaning and range of equivalents are intended to be embraced therein.

I claim:

1. A transparent multilayer coextruded heat shrinkable barrier film for use in packaging, comprising:
   first and second outer layers formed using a transparent amorphous polymer;
   an inner nanolayer sequence including at least three nanolayers a) including ethylene vinyl alcohol, alternating with at least three nanolayers b) including at least one of ethylene ethyl acrylate and ethylene acrylic acid, each of the nanolayers b) having a degree of crystallinity less than about 45%; and
   adhesive nanolayers including at least one of ethylene ethyl acrylate and ethylene acrylic acid between each of the first and second outer layers and the inner nanolayer sequence;
   wherein the film has a light transmittance of at least about 80% and a heat shrink of at least about ten percent in at least one direction and the transparent amorphous polymer in each of the first and second outer layers comprises an amorphous polyester copolymer.

2. The transparent multilayer coextruded heat shrinkable barrier film of claim 1, wherein the film has a heat shrink of at least about ten percent in at least two mutually perpendicular directions.

3. The transparent multilayer coextruded heat shrinkable barrier film of claim 1, wherein the film has a heat shrink of at least about 20 percent in at least one direction.

4. The transparent multilayer coextruded heat shrinkable barrier film of claim 3, wherein the film has a heat shrink of at least about 20 percent in at least two mutually perpendicular directions.

5. The transparent multilayer coextruded heat shrinkable barrier film of claim 1, wherein the film is rendered heat shrinkable by stretch orientation.

6. The transparent multilayer coextruded heat shrinkable barrier film of claim 1, wherein the film is rendered heat shrinkable by vacuum thermoforming.

7. The transparent multilayer coextruded heat shrinkable barrier film of claim 1, wherein the inner nanolayer sequence comprises at least five of the nanolayers a) and at least five of the nanolayers b).

8. The transparent multilayer coextruded heat shrinkable barrier film of claim 1, wherein the nanolayers b) have a degree of crystallinity less than about 20%.

9. The transparent multilayer coextruded heat shrinkable barrier film of claim 8, wherein the nanolayers b) have a degree of crystallinity less than about 15%.

10. The transparent multilayer coextruded heat shrinkable barrier film of claim 1, wherein the nanolayers b) further comprise at least one of low density polyethylene and linear low density polyethylene and have a degree of crystallinity less than about 40%.

11. The transparent multilayer coextruded heat shrinkable barrier film of claim 1, wherein the film has a light transmission of at least about 84%.

12. The transparent multilayer coextruded heat shrinkable barrier film of claim 1, wherein the film has a light transmission of at least about 88%.

13. The transparent multilayer coextruded heat shrinkable barrier film of claim 1, wherein the amorphous polyester copolymer comprises polyethylene terephthalate glycol.

14. The transparent multilayer coextruded heat shrinkable barrier film of claim 1, wherein the amorphous polymer in at least one of the first and second outer layers further comprises at least one of an amorphous polystyrene or polystyrene copolymer, a polycarbonate, and an amorphous acrylic polymer.

15. The transparent multilayer coextruded heat shrinkable barrier film of claim 1, wherein the adhesive nanolayers between each of the first and second outer layers and the inner nanolayer sequence further comprise an anhydride-grafted polyolefin.

16. The transparent multilayer coextruded heat shrinkable barrier film of claim 1, further comprising a second inner nanolayer sequence including a plurality of nanolayers c) including a first low density polyethylene or linear low density polyethylene, alternating with nanolayers d) including a second low density polyethylene or linear low density polyethylene, wherein each of the nanolayers c) and d) has a degree of crystallinity less than about 45%.

17. The transparent multilayer coextruded heat shrinkable barrier film of claim 16, wherein each of the nanolayers c) and d) has a degree of crystallinity less than about 40%.

18. A transparent multilayer coextruded heat shrinkable barrier package, including two opposing film segments joined at edges of each film segment, each film segment comprising:
    first and second outer layers formed using a polyester copolymer;
    an inner nanolayer sequence including at least three nanolayers a) including ethylene vinyl alcohol, alternating with at least three nanolayers b) including at least one of ethylene ethyl acrylate and ethylene acrylic acid; and
    adhesive nanolayers including at least one of ethylene ethyl acrylate and ethylene acrylic acid between each of the first and second outer layers and the inner nanolayer sequence;
    wherein the transparent multilayer coextruded heat shrinkable barrier package has a light transmittance of at least about 80% and a heat shrinkage of at least about 10% in at least one direction and the transparent amorphous polymer in each of the first and second outer layers comprises an amorphous polyester copolymer.

19. The transparent multilayer coextruded heat shrinkable barrier package of claim 18, wherein at least one of the first and second outer layers comprises polyethylene terephthalate glycol.

20. The transparent multilayer coextruded heat shrinkable barrier package of claim 18, wherein the heat shrinkage is at least about 25% in at least one direction.

21. The transparent multilayer coextruded heat shrinkable barrier package of claim 18, wherein each film segment further comprises a second inner nanolayer sequence including a plurality of nanolayers c) including a first low density polyethylene or linear low density polyethylene, alternating with nanolayers d) including a second low density polyethylene or linear low density polyethylene, wherein each of the nanolayers c) and d) has a degree of crystallinity less than about 45%.

22. A transparent multilayer coextruded heat shrinkable barrier package, including two opposing film segments joined at edges of each film segment, each film segment comprising:
    first and second outer layers formed using polyethylene terephthalate glycol;
    an inner nanolayer sequence including at least three nanolayers a) including ethylene vinyl alcohol, alternating with at least three nanolayers b) including at least one of ethylene ethyl acrylate and ethylene acrylic acid; and
    adhesive nanolayers including at least one of ethylene ethyl acrylate and ethylene acrylic acid between each of the first and second outer layers and the inner nanolayer sequence;
    wherein the transparent multilayer coextruded heat shrinkable barrier package has a light transmittance of at least about 88% and a heat shrinkage of at least about 20% in at least one direction and the transparent amorphous polymer in each of the first and second outer layers comprises an amorphous polyester copolymer.

* * * * *